United States Patent [19]

Rademeyer

[11] Patent Number: 5,598,471
[45] Date of Patent: Jan. 28, 1997

[54] METHOD AND APPARATUS FOR ENCODING AND DECODING OF AUDIO TRANSMISSION SIGNALS

[75] Inventor: Pieter Rademeyer, Pretoria, South Africa

[73] Assignee: South African Microelectronic Systems Ltd., South Africa

[21] Appl. No.: 339,464

[22] Filed: Nov. 14, 1994

[30] Foreign Application Priority Data

Nov. 16, 1993 [ZA] South Africa .................. 93/8534

[51] Int. Cl.⁶ .................. H04L 9/00; H04N 7/16
[52] U.S. Cl. .................. 380/9; 380/13; 380/19; 380/33; 380/34; 380/49
[58] Field of Search .................. 380/9, 10, 12, 380/13, 15, 19, 33, 34, 46–7, 49; 375/202

[56] References Cited

U.S. PATENT DOCUMENTS

| | | | |
|---|---|---|---|
| 4,276,652 | 6/1981 | McCalmont et al. | 380/34 |
| 4,389,671 | 6/1983 | Posner et al. | 380/10 |
| 4,476,566 | 10/1984 | Dent | 375/202 |
| 4,479,226 | 10/1984 | Prabhu et al. | 380/34 |
| 4,578,817 | 3/1986 | Rabain et al. | 380/34 |
| 4,586,081 | 4/1986 | St. Arnaud et al. | 380/19 |
| 4,606,040 | 8/1986 | David et al. | 380/34 |

*Primary Examiner*—Bernarr E. Gregory
*Attorney, Agent, or Firm*—Tilton, Fallon, Lungmus & Chestnut

[57] ABSTRACT

A system for encoding and decoding an audio transmission signal comprises: (a) an encoder with a frequency-varying means to vary the carrier frequency of the audio signal according to an encryption algorithm; (b) a transmitter; (c) a receiver; and (d) a decoder with a multi-plexing filter for separating segments of the audio signal with identical carrier frequencies, and a demodulator corresponding to each carrier signal frequency. The separated segments of the audio signal are switched to the corresponding demodulators according to a decryption algorithm.

25 Claims, 4 Drawing Sheets 5,598,471

METHOD AND APPARATUS FOR ENCODING AND DECODING OF AUDIO TRANSMISSION SIGNALS

FIELD OF THE INVENTION

THIS INVENTION relates to an apparatus for encoding and decoding of audio transmission signals and to a method of operation thereof and, more particularly but not exclusively, to an apparatus and a method for encoding and decoding of audio frequency broadcast signals.

BACKGROUND TO THE INVENTION

In the discussion which follows, the invention will be described with reference to the encoding and decoding of the audio frequency portion of a television broadcast signal, but it is to be clearly understood that the scope of the invention is not limited to this application.

The encoding and decoding of broadcast signals to enforce the collection of license fees from subscribers to the broadcast signals is well known.

One such system suitable for encoding television broadcast signals is described in applicants' above-mentioned co-pending South African patent application No. 93/2436. In this system, the video portion of the television broadcast signal is encoded, while the audio portion of the broadcast signal remains "in clear". This is disadvantageous as pirate viewers are still able to hear the audio frequency portion of the broadcast signal.

As far as the applicant is aware, all known systems for the encoding and decoding of audio transmission signals require the audio signals to be mixed down to baseband frequencies prior to being encoded and decoded.

OBJECT OF THE INVENTION

It is an object of this invention to provide an apparatus and a method for encoding and decoding of audio transmission signals which will, at least partially alleviate the above-mentioned difficulties.

SUMMARY OF THE INVENTION

In accordance with this invention, there is provided a system for encoding and decoding an audio transmission signal, comprising:

an encoder for encoding the audio transmission signal prior to transmission, the encoder having frequency-varying means for varying the carrier frequency of the signal to be any one of a plurality of known frequencies, in accordance with an encryption pseudo-random formula;

a transmitter for transmitting the encoded signal;

a receiver for receiving the encoded signal; and a decoder for decoding the received signal, the decoder having a demultiplexing filter for separating segments of the received signal corresponding to each one of the plurality of known carrier frequencies, and means for selectively connecting each segment of the received signal to a corresponding demodulator in accordance with a decryption pseudo-random formula.

Further features of the invention provide for the audio transmission signal to be the audio frequency portion of a television broadcast signal, and for the system to include means for separately encoding and decoding the video portion of the television broadcast signal.

Further features of the invention provide for the system to include a synchronizing means for synchronizing the encryption and decryption pseudo-random formulas, and for the synchronizing means to be at least one timing pulse in the encoded signal.

Yet further features of the invention provide for the demultiplexing filter to be an acoustic wave filter, preferably a surface acoustic wave filter, for the surface acoustic wave filter to have an input and a plurality of outputs to cause different frequency components of a signal applied to the input of the filter to appear at each output of the filter, for each output of the surface acoustic wave filter to be individually selectable by a switching means, and for the switching means to be any one of a field-effect transistor or a PIN diode.

There is also provided for the system to include at least two control processors for executing respectively, the encryption and decryption pseudo-random formulas, and for each pseudo-random formula to cause its associated processor to select only one of the outputs of its corresponding surface acoustic wave filter at a time.

Preferably, the decoder includes an interface port adapted to receive a memory, the decryption pseudo-random formula is stored in the memory, the memory is a smart card, and the smart card is selectively programmable to alter the stored decryption pseudo-random formula.

There is also provided for the system to include converting means for converting the frequency of the received signal to the center frequency of the surface acoustic wave filter, and for the surface acoustic wave filter, the control processor and the switching means corresponding to each output of the surface acoustic wave filter to be fabricated as a hybrid integrated circuit.

The invention extends to an encoder adapted for use in the system described above for encoding the transmission signal, and to a decoder adapted for use in the system described above for decoding the transmission signal.

The invention extends to provide a method for encoding and decoding an audio transmission signal, comprising the steps of:

encoding the audio transmission signal prior to transmission by means of an encoder having a frequency-varying means for varying the carrier frequency of the signal to be any one of a plurality of known frequencies, in accordance with an encryption pseudo-random formula;

transmitting the encoded signal by means of a transmitter;

receiving the encoded signal at a receiver;

separating, by means of a demultiplexing filter, the segments of the received signal corresponding to each one of the plurality of known carrier frequencies; and decoding the received signal by selectively connecting each segment of the received signal to a corresponding demodulator in accordance with a decryption pseudo-random formula.

There is also provided for synchronizing the encryption and decryption pseudo-random formulas by means of timing pulses in the encoded signal, for executing the encryption and decryption pseudo-random formulas in different control processors, for storing the decryption pseudo-random formula in a memory connectable to an interface port on the decoder, and for the memory to be selectively programmable at selected times to alter the stored decryption pseudo-random formula.

There is also provided, prior to encoding, for splitting the audio transmission signal from a composite television broadcast signal, and for recombining the encoded audio transmission signal with the video portion of the television broadcast signal to produce an encoded composite television broadcast signal prior to transmission.

There is also provided, prior to decoding, for splitting the encoded audio transmission signal from the received encoded composite television broadcast signal, and for recombining decoded audio transmission signal with the video portion of the television broadcast signal for display on a television monitor.

BRIEF DESCRIPTION OF THE DRAWING

One embodiment of the invention is described below, by way of example only, and with reference to the accompanying sketches, in which.

DETAILED DESCRIPTION WITH REFERENCE TO THE DRAWINGS

Figure 1:
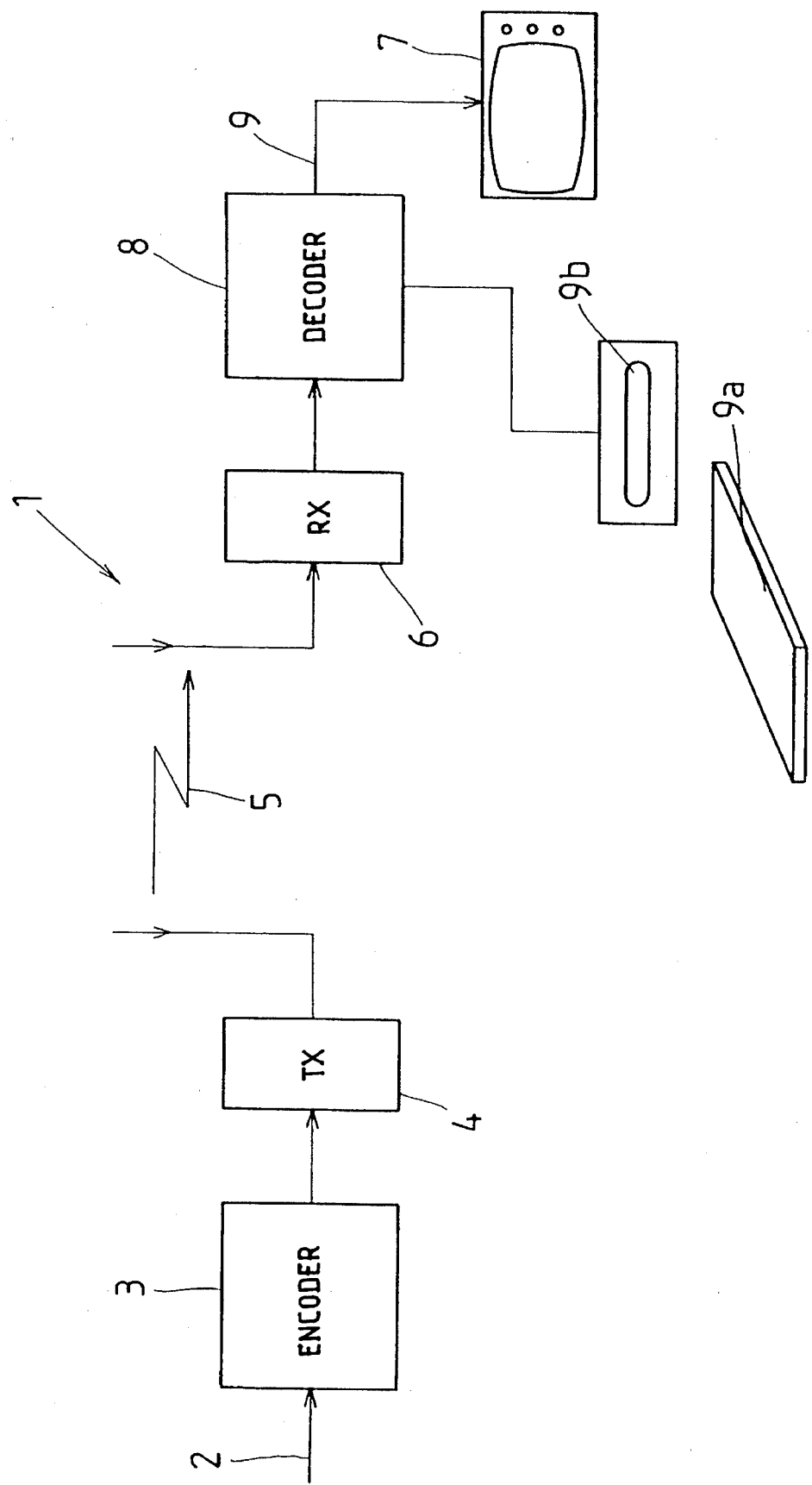
FIG. 1 is a functional block diagram of a system for encoding and decoding an audio transmission signal.

Referring to FIG. 1, a system for encoding and decoding an audio transmission signal is indicated generally by reference numeral (1). A television broadcast signal (2) is encoded by an encoder (3) to cause the carrier frequency of the audio frequency portion of the television broadcast signal to be randomly varied. The encoded signal output by the encoder (3) is broadcast by one or more transmitters (4) over a communication channel (5). In the block diagram of FIG. 1, the transmitter (4) is also identified by the symbol or legend TX while the receiver (6) also carriers the symbol RX.

The transmitted television broadcast signal is received by a receiver (6) and, if displayed on a television monitor (7) without decoding of the audio frequency portion of the signal, will produce an image with an unintelligible soundtrack. The received signal is decoded by a decoder (8) which compensates for the variable carrier frequency of the audio frequency portion of the television broadcast signal to produce a reconstructed television broadcast signal in which the audio sound track is "in clear".

The decoder (8) is activated by means of a smart card (9a) which is insertable into an interface port (9b) on the decoder (8). The smart card (9a) contains configuration data for enabling the decoder, and the data may be altered from time to time to enable the encoder (3) and the decoder (8) to be used for implementing a pay-television subscription service.

Figure 2:
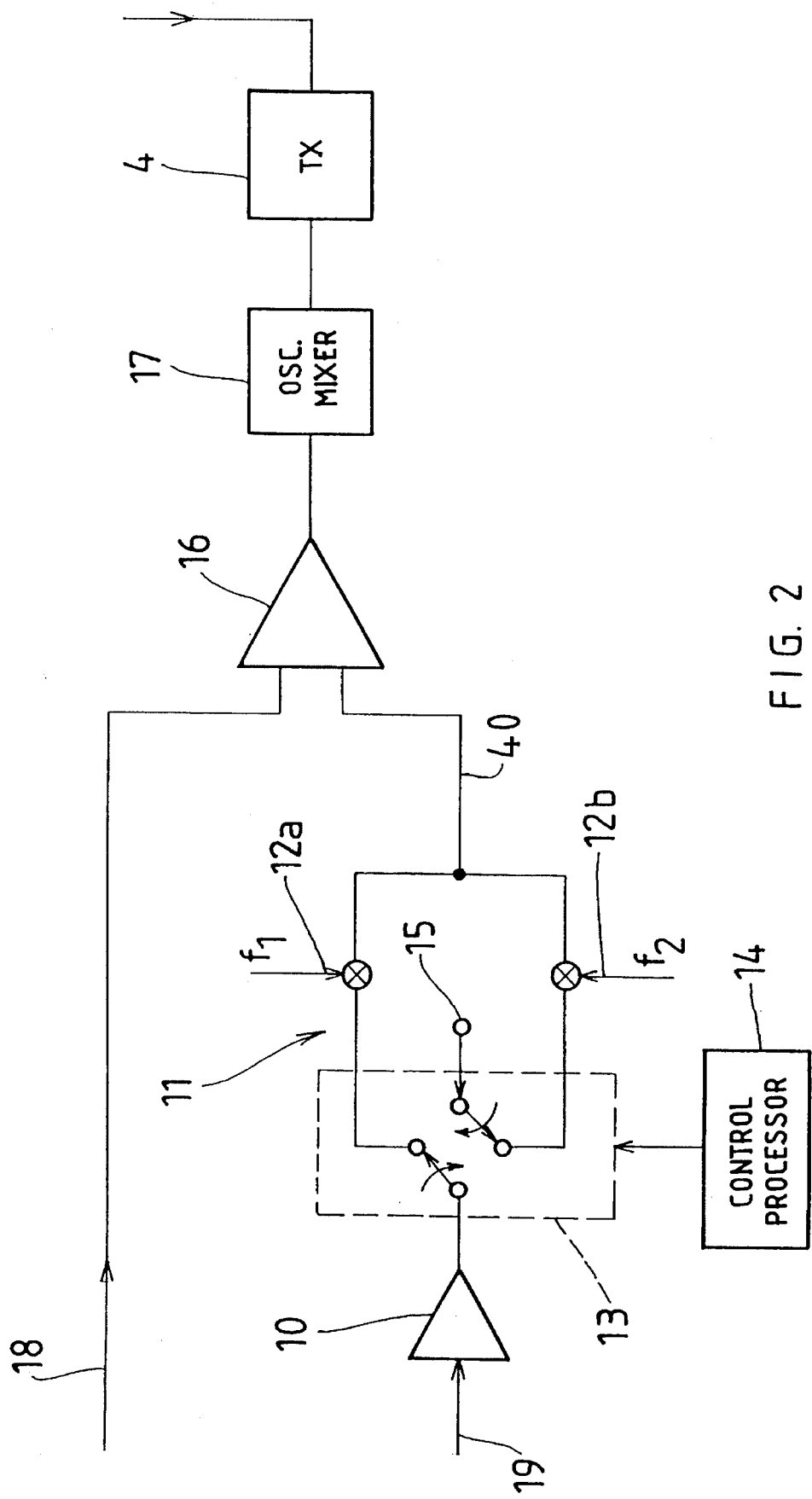
FIG. 2 is a functional block diagram of an encoder of the system of FIG. 1.

Turning now to FIG. 2, in which features similar to those of FIG. 1 are indicated by like numerals, the encoder (3) is shown in greater detail. The audio frequency portion (19) of the television broadcast signal (2) is amplified by means of an amplifier (10) and modulated by means of a variable frequency modulator which is indicated generally by reference numeral (11). The variable-frequency modulator (11) includes two carrier signals (12a and 12b) having different frequencies and which are produced by means of local oscillators (not shown), as well as a switch matrix (13). The switch matrix (13) is operable to selectively cause the audio frequency portion (19) of the television broadcast signal (2) to selectively modulate either one of the carrier signals (12a or 12b) at a time. At any instant the carrier signal (12a or 12b) which is not modulated by the audio frequency portion (19) of the television broadcast signal (2) is modulated by means of white noise (15).

An encryption algorithm executes in a control processor (14) and regulates the operation of the switch matrix (13). The encryption algorithm is a pseudo-random sequence generator which is arranged to cause only one of the carrier signals (12a or 12b) to be modulated by the audio frequency portion (19) of the television broadcast signal (2), at any time.

Figure 3:
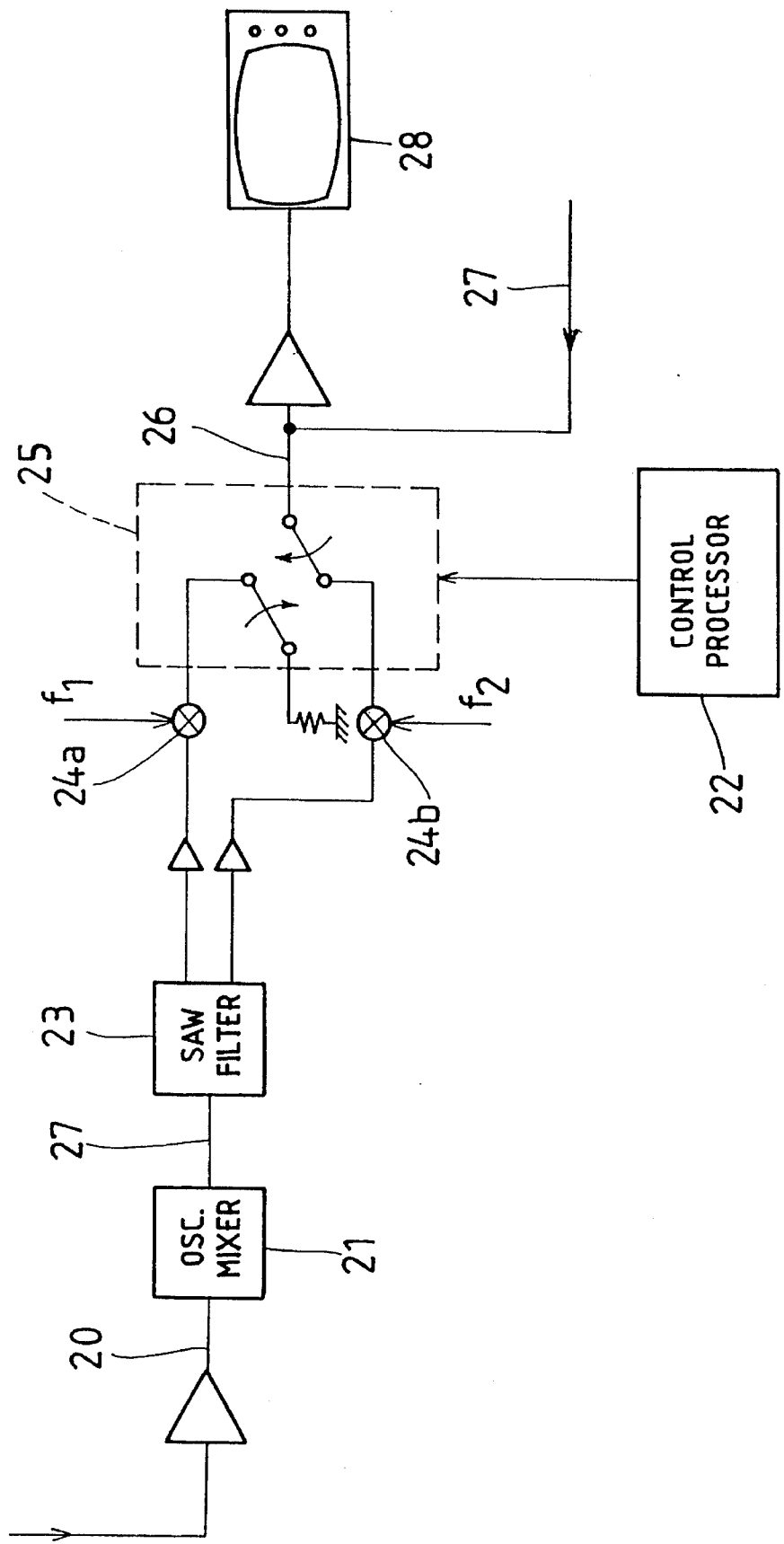
FIG. 3 is a functional block diagram of a decoder of the system of FIG. 1.

The output (46) of the modulator (11) is therefore a variable-frequency carrier (15) which is modulated by the audio frequency portion (19) of the television broadcast signal (2). The modulator output (40) is combined, at (16), with the video portion (18) of the television broadcast signal. The combined signal (16) is mixed up or down to any desired UHF or VHF transmission frequency by means of a local oscillator and mixer (17), and is subsequently transmitted by the transmitter 4 of FIG. 1. Turning now to FIG. 3, in which features similar to those of FIGS. 1 and 2 are indicated by like numerals, the decoder (8) is shown in greater detail. The received encoded television broadcast signal (20) is fed into the input of a surface acoustic wave (SAW) filter (23) in which acoustic waves are propagated along the surface of a piezoelectric substrate (not shown) which has a low acoustic loss. Prior to being applied to the SAW filter (23), the received signal is mixed up or down from the transmission frequency, to the center frequency of the SAW filter by means of a mixer and local oscillator pair (21).

The use of a SAW device as a delay line is well known in the art. Such a delay line has an input and a number of outputs (taps) located on the substrate at different physical distances from the input. An electrical signal applied to the input will cause an acoustic wave to propagate along the substrate of the delay line and will result in the reproduction of the input signal to appear at each tap, but delayed by the time taken for the acoustic wave to travel from the input to the particular output tap. Each of the taps of the SAW delay line may be individually switched by means of a field effect transistor.

Another use of a SAW device is as a filter. In this type of filter, a signal applied to the input of the SAW device will result in different frequency components of the input signal to appear at each tap. The SAW filter may also be used in an inverse manner, in which the filter has a single output and a number of inputs. An electrical signal applied to any one of the inputs will reproduced at the output as described above, and the output signal will be a combination of the frequency components of all the input signals.

Each individual tap of the SAW filter (23) is connected to a corresponding demodulator (24a and 24b). Two signals (12a and 12b) having different frequencies are produced by means of local oscillators (not shown) and are connected, respectively, to the demodulators (24a and 24b). These two signals have the same frequencies, respectively, as the carrier signals (12a and 12b) of FIG. 2.

The outputs of the demodulators (24a and 24b) are connected to a switch matrix (25) which is operable to selectively pass the output of either one of the demodulators (24a and 24b) at a time. The individual switches of the switch matrix are field-effect-transistors (FETs).

The operation of the switch matrix (25) is regulated by a decryption algorithm executing in a second control processor (22). The decryption algorithm is a pseudo-random sequence generator identical to the encryption algorithm of the encoder (3). The encryption and decryption algorithms are synchronized by means of timing pulses added to the audio transmission signal by means of appropriate electronic circuitry (not shown) prior to encoding. The synchronization pulses are used by the control processor (22) for clocking the decryption algorithm and removed from the signal during or after decryption. The output of each demodulator (24a and 24b) consists of segments of the audiofrequency portion (19) of the television broadcast signal (2), interspersed with segments of white noise, resulting from the modulation of the corresponding carrier signal at the modulator (11) of FIG. 2. The decryption algorithm activates the switches of the switch matrix (25) in the correct sequence to cause the output of the switch matrix (25) to be the audiofrequency portion (19) of the television broadcast signal (2) which has been reconstituted from the demodulated segments in the correct order.

The decoded audio frequency portion of the television broadcast signal is recombined, at (26), with the video portion (27) of the signal, and the combined signal (26) may then be displayed on a television monitor (28) in the conventional manner.

The SAW filter (23) operates at radio frequencies. In contrast, other known systems for encoding and decoding audio transmission signals operate at baseband frequencies.

The decryption algorithm is stored in a memory (not shown) on the smart card (9a). The decryption algorithm may be executed by the control processor (22) only when the smart card (9a) is inserted into the interface port (9b). The encryption and decryption algorithms may be altered at regular intervals, say yearly. When the encryption algorithm is changed, a subscriber to the television broadcast signal (2) will require an updated decryption algorithm in the smart card (9a) in order to be able to decode the encoded transmission signal. In this manner, the collection of license fees from subscribers to the broadcast signal may be enforced, and pirate listeners may be simply and easily eliminated.

A single acoustic wave filter (23), a single control processor (22) and corresponding switch FETs may be fabricated as a single hybrid device by using hybrid packaging technologies, thereby enabling the mass production of low-cost decoders (8).

Figure 4:
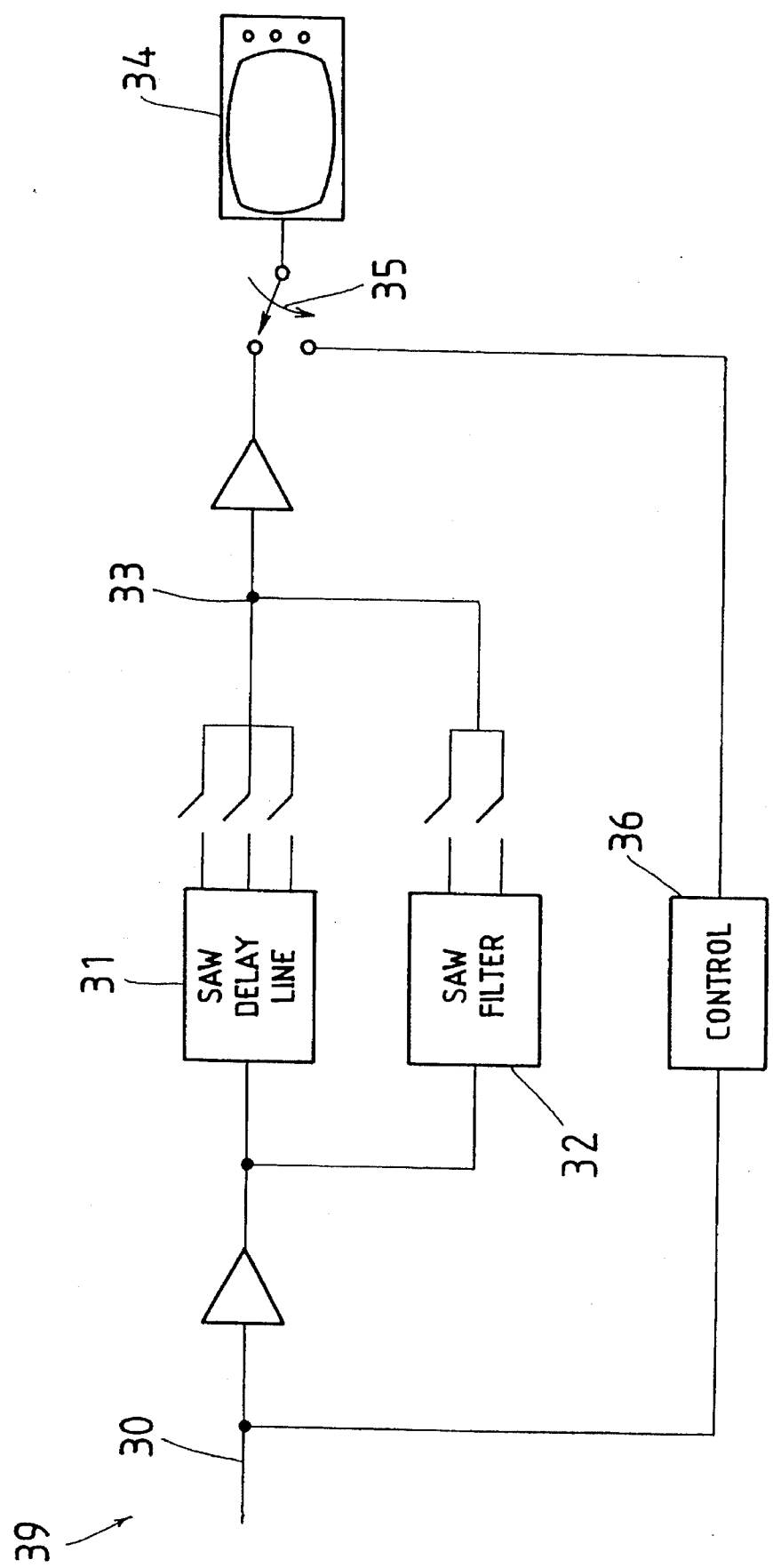
FIG. 4 is a functional block diagram of a combination decoder for decoding both audio and video transmission signals.

The video portion of the television broadcast signal may, optionally, be encoded as described in applicant's South African Patent Application No. 93/2436. Referring to FIG. 4, decoder for decoding a television broadcast signal (30) of which both the audio frequencies and video portions are encoded is indicated generally by reference numeral (39). The video portion of the encoded signal (31) is decoded by means of techniques described in applicant's Patent Application No. 93/2436.

The encoded signal (30) is directed to a SAW delay line (31) and to a SAW filter (32). The SAW delay line (31) passes through the video portion of the encoded signal which is decoded as described in the above patent application.

The SAW filter passes through the audio frequency portion of the encoded signal which is decoded in the manner described above. The decoded audio and video portions of the television broadcast signal are combined, at (33) and displayed on a television monitor (34). The system includes a switch (35) which is operable by means of control circuitry (36) to bypass the decoding element when the broadcast signal (30) is transmitted in unencoded form.

Numerous modifications are possible to the above embodiment without departing from the scope of the invention, for example, the number of carrier frequencies used in the encoding of the audio transmission signal could be increased from two to some greater number. This will necessitate a corresponding increase in the number of taps on the SAW filter (23) and in the number of switches in the switch matrixes (13 and 25). Further, the switch FETs could be replaced by PIN diodes or by any other known type of switching device.

The invention therefore provides a simple and inexpensive means for encoding and decoding audio transmission signals at radio frequencies, and enables the implementation of a pay-television service embodying both audio and video encoding.

I claim:

1. A system for encrypting and decrypting an audio transmission signal, comprising:

an encoder for encrypting the audio transmission signal prior to transmission, the encoder having frequency-varying means for varying the carrier frequency of the signal to be any one of a plurality of known frequencies, in accordance with an encryption algorithm;

a transmitter for transmitting the encrypted signal;

a receiver for receiving the encrypted signal; and a decoder for decrypting the received signal, the decoder having a demultiplexing filter for separating segments of the received signal corresponding to each one of the plurality of known carrier frequencies, and means for selectively connecting each segment of the received signal to a corresponding demodulator in accordance with a decryption algorithm.

2. A system for encrypting and decrypting an audio transmission signal as claimed in claim 1, in which the audio transmissions signal is the audio frequency portion of a television broadcast signal.

3. A system for encrypting and decrypting an audio transmission signal as claimed in claim 2, which includes means for separately encrypting and decrypting the video portion of the television broadcast signal.

4. A system for encrypting and decrypting and audio transmission signal as claimed in claim 1, which includes a synchronizing means for synchronizing the encryption algorithm and the decryption algorithm.

5. A system for encrypting and decrypting an audio transmission signal as claimed in claim 4 in which the synchronizing means is at least one timing pulse in the encrypted signal.

6. A system for encrypting and decrypting and audio transmission signal s claimed in claim 1 in which the demultiplexing filter is an acoustic wave filter.

7. A system for encrypting and decrypting an audio transmission signal as claimed in claim 6 in which the acoustic wave filter is a surface acoustic wave filter.

8. A system for encrypting and decrypting an audio transmission signal as claimed in claim 7 in which the surface acoustic wave filter has an input and a plurality of outputs to cause different frequency components of a signal applied to the input of the filter to appear at each output of the filter.

9. A system for encrypting and decrypting an audio transmission signal as claimed in claim 8 in which each output of the surface acoustic wave filter is individually selectable by a switching means.

10. A system for encrypting and decrypting an audio transmission signal as claimed in claim 9 in which the switching means is either one of a field-effect transistor or a PIN diode.

11. A system for encrypting and decrypting an audio transmission signal as claimed in claim 1 which includes at least two control processors for executing respectively, the encryption algorithm and the decryption algorithm.

12. A system for encrypting and decrypting an audio transmission signal as claimed in claim 11 in which each algorithm causes its associated processor to select only one of the outputs of its corresponding surface acoustic wave filter at a time.

13. A system for encrypting and decrypting an audio transmission signal as claimed in claim 1 which includes an interface port, a memory and means connecting said memory to said interface port.

14. A system for encrypting and decrypting an audio transmission signal as claimed in claim 13 in which the decryption algorithm is stored in the memory.

15. A system for encrypting and decrypting an audio transmission signal as claimed in claim 13 in which the memory is a first smart card.

16. A system for encrypting and decrypting an audio transmission signal as claimed in claim 15 in which the system includes a second smart card selectively programmable to alter the stored decryption pseudo-random having a decryption algorithm different from that of the first mentioned smart card.

17. A system for encrypting and decrypting an audio transmission signal as claimed in claim 1 in which the demultiplexing filter is a surface acoustic wave filter and which includes converting means for converting the frequency of the received signal to the center frequency of the surface acoustic wave filter.

18. A system for encrypting and decrypting and audio transmission signal as claimed in claim 1 in which the surface acoustic wave filter, the control processor and the switching means corresponding to each output of the surface acoustic wave filter are fabricated as a hybrid integrated circuit.

19. A method for encrypting and decrypting an audio transmission signal, comprising the steps of:

encrypting the audio transmission signal prior to transmission by means of an encoder having a frequency-varying means for varying the carrier frequency of the signal to be any one of a plurality of known frequencies, in accordance with an encryption algorithm;

transmitting the encrypted signal by means of a transmitter;

receiving the encrypted signal at a receiver;

separating, by means of a demultiplexing filter, the segments of the received signal corresponding to each one of the plurality of known carrier frequencies; and decrypting the received signal by selectively connecting each segment of the received signal to a corresponding demodulator in accordance with a decryption algorithm.

20. A method as claimed in claim 19 which includes the further step of synchronizing the encryption algorithm and the decryption algorithm by means of timing pulses in the encrypted signal.

21. A method as claimed in claim 19 in which the encryption algorithm and the decryption algorithm are executed in different control processors.

22. A method as claimed in claim 19 in which the decryption algorithm is stored in a memory connected to an interface port on the decoder.

23. A method as claimed in claim 22 which includes selectively programming the memory at selected times to alter the stored decryption algorithm.

24. A method as claimed in claim 19 which includes the further steps of splitting, prior to encrypting, the audio transmission signal from a composite television broadcast signal, and for recombining the encrypted audio transmission signal with the video portion of the television broadcast signal to produce an encrypted composite television broadcast signal prior to transmission.

25. A method as claimed in claim 24 which includes the further steps of splitting, prior to decrypting, the encrypted audio transmission signal from the received encrypted composite television broadcast signal, and for recombining the decrypted audio transmission signal with the video portion of the television broadcast signal for display on a television monitor.

* * * * *